Oct. 14, 1952  H. J. DORGELYS  2,613,419
FASTENER
Filed May 16, 1949  4 Sheets-Sheet 2
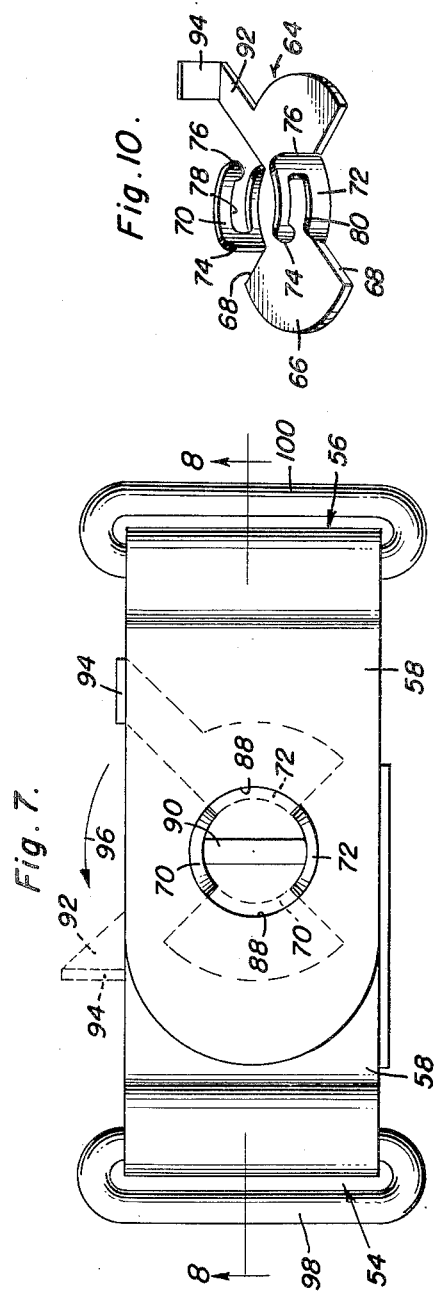
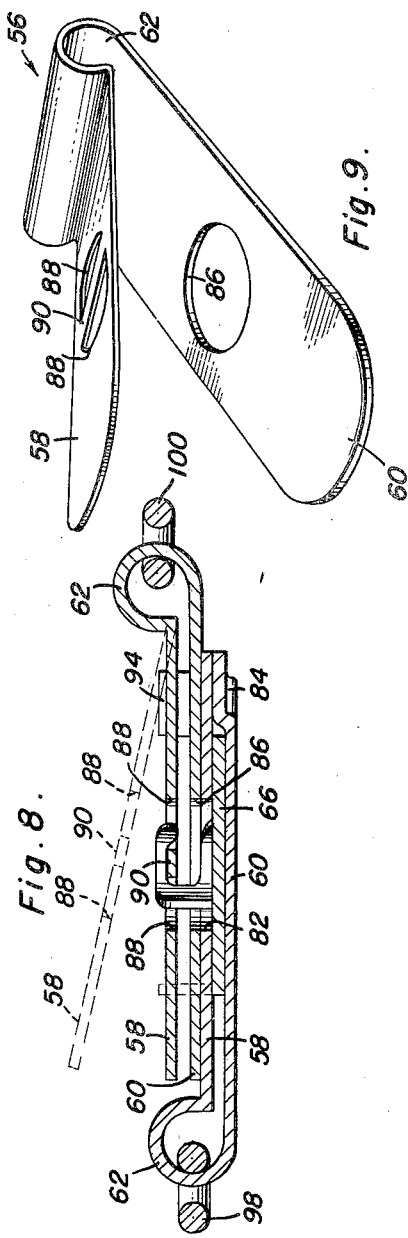
Inventor
Henri J. Dorgelys
By Clarence A. O'Brien
and Harvey B. Jacobson
Attorneys

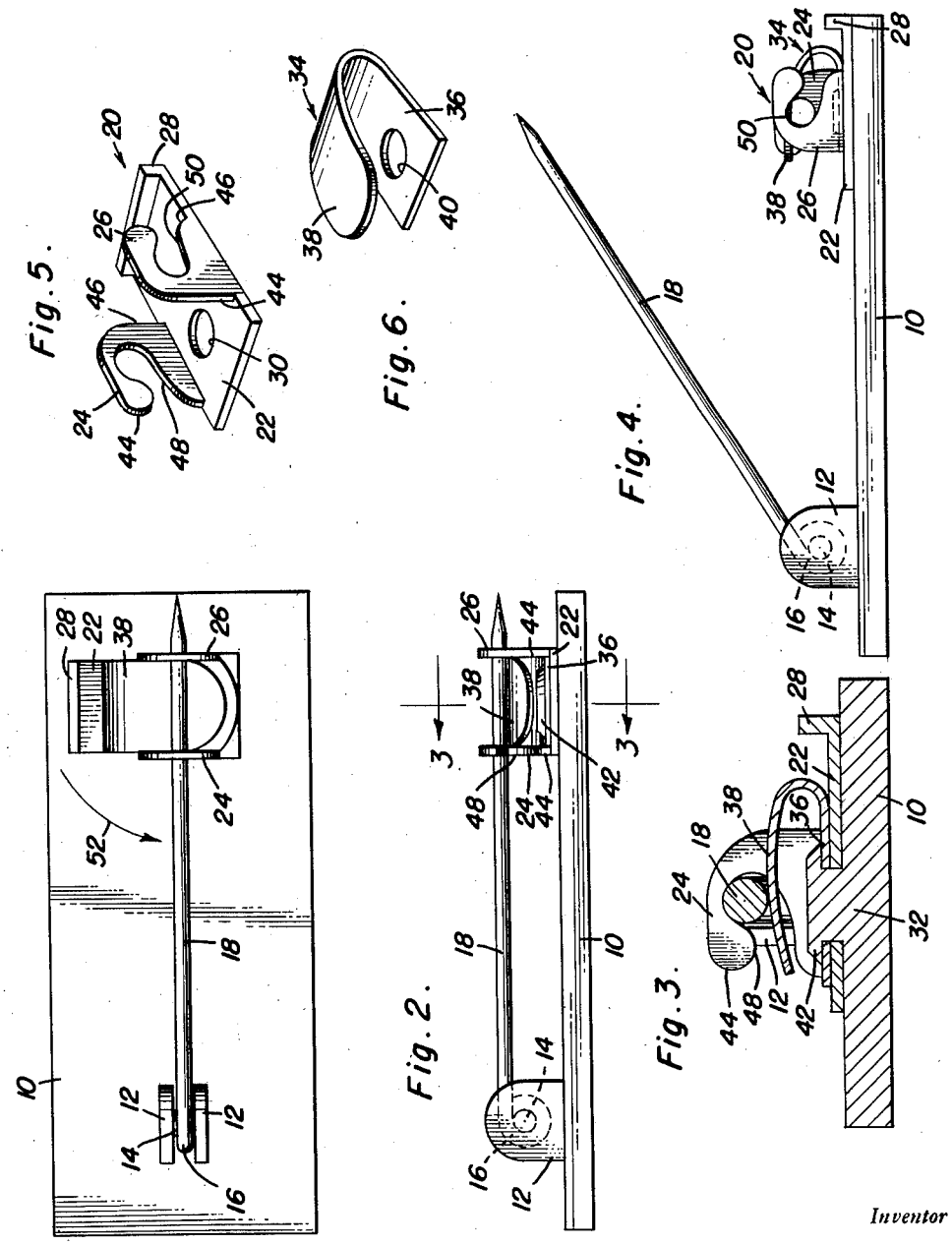

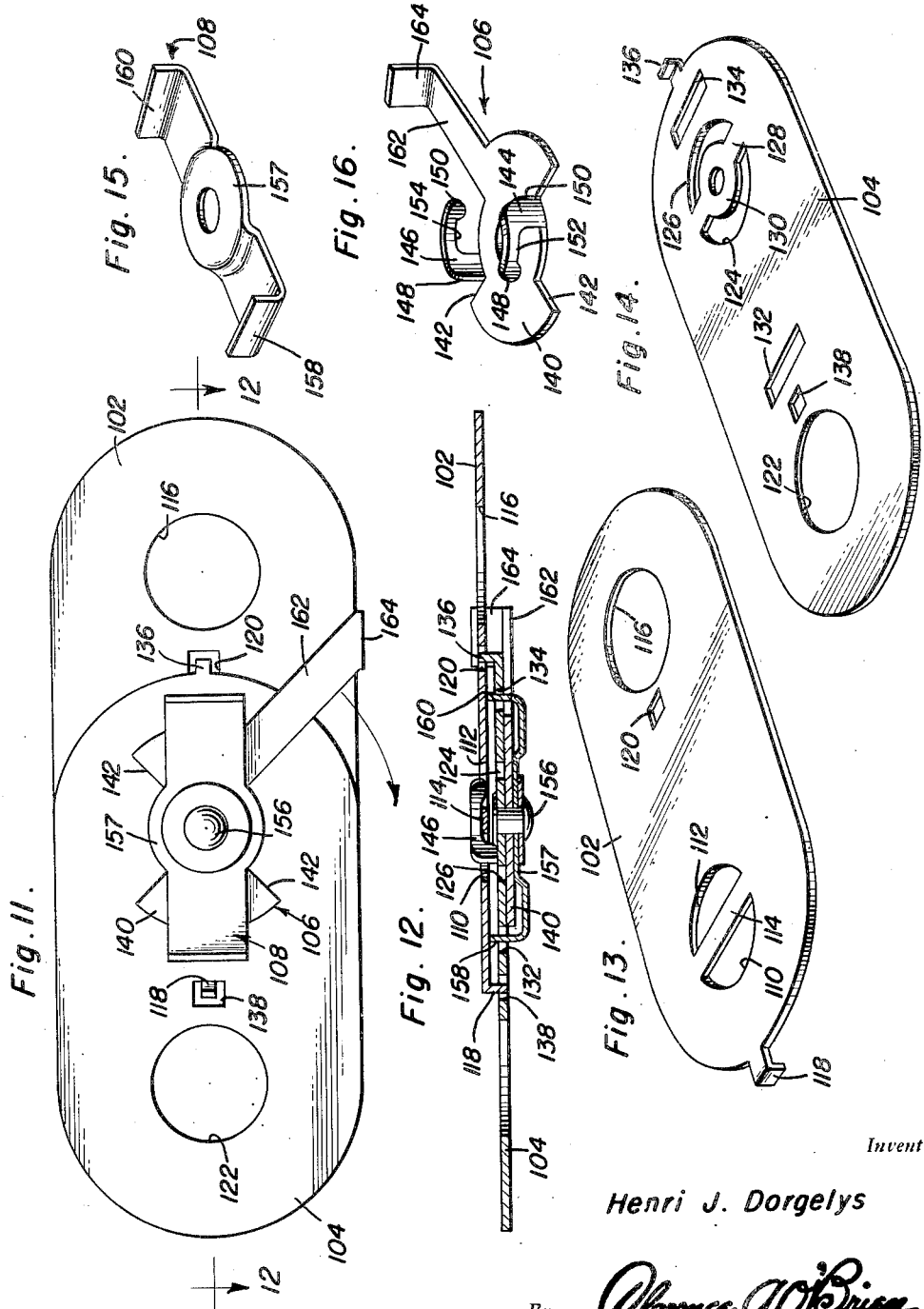

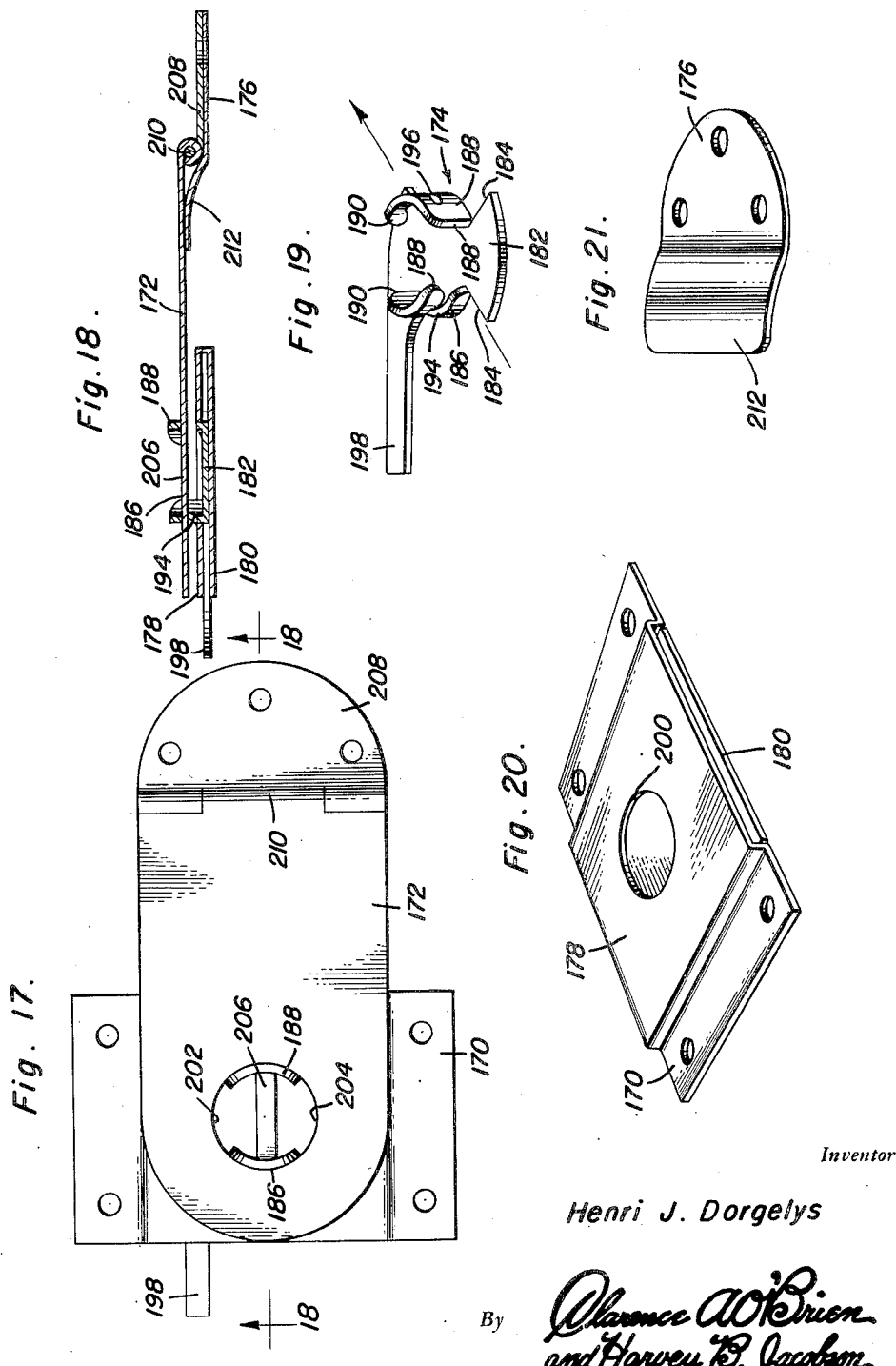

Patented Oct. 14, 1952

2,613,419

UNITED STATES PATENT OFFICE 2,613,419

FASTENER

Henri J. Dorgelys, Hempstead, N. Y.

Application May 16, 1949, Serial No. 93,565

11 Claims. (Cl. 24—157)

This invention relates to new and useful improvements in fasteners and the primary object of the present invention is to provide a novel and improved safety attachment for articles of jewelry, such as chains, bracelets, necklaces, brooches, indicia bearing plates or the like, that will prevent accidental opening of a safety pin.

Another important object of the present invention is to provide a safety catch including a rotatable locking member having a pair of bayonet slots therein for receiving the safety pin of a badge, brooch or the like, and embodying novel and improved means for resiliently locking the pin in the slots.

Yet another object of the present invention is to provide a jewel fastening device so constructed as to permit the same to be employed for joining the ends of a bracelet, necklaces or chain and which is particularly adaptable for holding the safety pins of brooches, badges or indicia bearing plates.

A further object of the present invention is to provide a jewel fastener including a rotatable locking element adapted to receive the safety pin of a catch, said element being quickly and readily actuated for releasing the pin in a convenient manner.

A still further aim of the present invention is to provide a jewel fastener of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention and showing the safety pin in its locked position;

Figure 2 is a side elevational view of Figure 1;

Figure 3 is an enlarged transverse vertical sectional view taken substantially on the plane of section line 3—3 of Figure 2;

Figure 4 is a view similar to Figure 2 and showing the safety pin in its unlocked position;

Figure 5 is a perspective view of the locking member or element used in conjunction with the form of the present invention illustrated in Figures 1-4 inclusive;

Figure 6 is a perspective view of the spring member used in conjunction with the locking element of Figure 5;

Figure 7 is a plan view of the present invention in slightly modified form in locked position and with dotted lines showing the unlocked position for the locking element;

Figure 8 is a longitudinal vertical sectional view taken substantially on the plane of section line 8—8 of Figure 7 and with dotted lines showing the position of one of the links when the locking element is rotated to its unlocked position;

Figure 9 is a perspective view of one of the spring clips or links used in conjunction with Figures 7 and 8;

Figure 10 is a perspective view of the locking member or element used in conjunction with the embodiment of the present invention illustrated in Figures 7 and 8;

Figure 11 is a plan view of the present invention in further modified form;

Figure 12 is a longitudinal vertical sectional view taken substantially on the plane of section line 12—12 of Figure 11;

Figure 13 is a perspective view of one of the pair of spring clips or plates that is used in conjunction with the form of the invention shown in Figures 11 and 12;

Figure 14 is a perspective view of the other of the pair of spring clips or plates that is used with the form of the invention shown in Figures 11 and 12;

Figure 15 is a perspective view of the spring element or member used in conjunction with the form of the invention disclosed in Figures 11 and 12;

Figure 16 is a perspective view of the locking member or element used with the form of the present invention shown in Figures 11 and 12;

Figure 17 is a plan view of the present invention in still further modified form;

Figure 18 is a longitudinal vertical sectional view taken substantially on the plane of section line 18—18 of Figure 17;

Figure 19 is a perspective view of the locking member or element used in conjunction with the form of the invention illustrated in Figures 17 and 18;

Figure 20 is a perspective view of one of the attaching plates or members that is employed with the structure shown in Figures 17 and 18; and Figure 21 is a perspective view of the spring member that is used with the form of the invention shown in Figures 17 and 18.

Referring now to the drawings in detail and more particularly to Figures 1–6 inclusive, wherein for the purpose of illustration, there is disclosed a preferred embodiment of the present invention, the numeral 10 represents a first member or base member of any suitable size, shape or material.

Fixed to or forming an integral part of the base member 10, is a pair of spaced parallel ears 12 that support a pin or pivot 14. The eye or loop end 16 of a safety pin, arm, or second member 18 is received on the pivot 14 for pivotal movement.

Means is provided for detachably securing the second member or safety pin 18 relative to the base member or first member 10 and for holding the second member or pin 18 against pivotal movement. This means comprises a locking member or element that is designated generally by the numeral 20.

The locking member 20 includes a substantially channel shaped member having an elongated plate 22 and a pair of outwardly projecting walls or leg portions 24 and 26. The plate 22 is provided with a finger grip or flange 28 at one end.

The plate 22 is formed with an aperture 30 disposed centrally between the walls 24 and 26 and this aperture receives a headed stud 32 acting as a pivot pin or lug projecting outwardly from the base member 10. It is preferred that the pivot pin 32 be integrally formed with the base member 10, however, the same may be suitably fixed or detachably secured to the base member.

The numeral 34 represents, generally, the spring member or U-shaped spring that is used with locking member 20. This spring member 34 includes inner and outer leg portions 36 and 38, and the leg portion 36 is provided with an opening 40 that receives the pivot pin 32.

The leg portion 36 bears upon the plate 22 and the plate 22 in turn is held upon the base member 10. The outer end of the pivot pin 32 is flattened, as at 42, to retain the spring member 34 relative to the locking member 20 and both the spring member 34 and locking member 20 against the base member 10 for rotation.

The walls 24 and 26 are provided with respective leading edges 44 and 46. A first bayonet slot 48 is provided in the leading edge 44 of the wall 24 and a second or further bayonet slot 50 is provided in the opposite or leading second edge 46 of the wall 26.

In practical use of the present invention, thus described in Figures 1–6 inclusive, the plate 22 is disposed in longitudinal alignment with the base member 10, with the flange 28 substantially flush with one end of the base member 10.

The pivoted arm or safety pin 18 is then swung toward the base member, as shown in Figure 4, so that by applying a pressure to the pin 18, the leg portion 38 of the spring member 34 will be forced toward the leg portion 36 of the said spring member.

While the leg portion 38 is thereby held depressed, the locking member 20 is rotated in the direction shown by arrow 52 in Figure 1, and the pin 18 will enter both bayonet slots 48 and 50 simultaneously.

The locking member 20 and spring 34 will be disposed perpendicular to the pin 18 when the pin 18 is in the bayonet slots, see Figures 1, 2 and 3, and the spring member will yieldingly lock the pin 18 in the said bayonet slots.

To release the pin 18 from its locked position, shown best in Figure 3, the locking member 20 is again pivoted or rotated to its position shown in Figure 4 so that the pin 18 will be urged or moved out of the bayonet slots.

Obviously, any suitable ornament, such as a jewel, indicia bearing plate or design may be secured to the base member 10.

Reference is now directed to Figures 7–10 inclusive, wherein there is disclosed the present invention in slightly modified form. In this embodiment, the numeral 54 represents a first member, spring clip or link and the numeral 56 represents a second member, spring clip or link.

Each of the members 54 and 56 include first and second leg portions 58 and 60 that are joined at one of their ends by a bend or transverse loop 62. The loops 62 normally urge the leg portions 58 and 60 spread relative to each other.

The locking member or element that is employed for detachably securing the members 54 and 56 together is designated generally by the numeral 64 and includes a substantially flat circular plate 66 having a pair of diametrically opposed peripheral, substantially V-shaped notches 68.

Integrally formed with or rigidly secured to the plate 66, at the apices of the notches 68, is a pair of diametrically opposed arcuate walls 70 and 72 having first and second edges 74 and 76.

The edge 76 of the wall 70 is provided with a bayonet slot 78 and the edge 74 of the plate 72 is also provided with a bayonet slot 80.

The locking member 64 is interposed between the leg portions 58 and 60 of the member 54 and the leg portion 58 of the member 54 is provided in a central circular opening 82 that receives the walls 70 and 72. The leg portions 58 and 60 of the member 54 are suitably secured together, as at 84, to retain the locking member relative to the member 54 for rotation.

The leg portion 60 of the member 56 is provided with a central opening 86 and the leg portion 58 of the member 56 is provided with a pair of semi-circular slots 88 that are spaced by a cross piece 90. The cross-piece 90 is integrally formed with the member 56 and is disposed diametrically of the opening 86 and transversely of the member 56.

An arm 92, integrally formed with the plate 66, projects radially from the plate 66, and is provided with a lateral projection 94 forming a finger grip.

In practical use of the structure disclosed in Figures 7–10 inclusive, the member 56 is placed in juxtaposition with the member 54 so that the walls 70 and 72 pass through the opening 86. Next, the leg portion 58 of the member 56 is forced toward the leg portion 60 of member 56 and the walls 70 and 72 extend through the openings 88.

The locking member 64 is then rotated by the grip 94 so that the cross piece 90 will enter the slots 78 and 80 and the grip 44 will then bear against one of the side edges of the member 56 as shown in Figure 7.

Due to the resilient characteristic of the member 56, the leg portion 58 thereof will yieldingly urge and retain the cross-piece 90 in the slots 78 and 80 until the leg portion 58 of member 56 is again depressed and the locking member rotated to its unlocked position in the direction of arrow 96 in Figure 7.

The loops 62 of the members 54 and 56 receive the ends or end links 98 and 100 of a bracelet, necklace or chain and due to the above construction the chain can be quickly and readily applied to or removed from a wearer in a safe and convenient manner.

Attention is next directed to Figures 11–16 inclusive wherein there is disclosed the present invention in further modified form. In this latest embodiment, the numerals 102 and 104 represent first and second members or plates that are to be detachably secured together through the medium of a locking member or element 106 and a spring member 108.

The first member or plate 102 includes a pair of semi-circular slots or openings 110 and 112 at one end that are separated by a cross-piece 114 forming an integral part of the member 102. A circular opening 116 is provided adjacent the other end of the member 102.

An angle member or L-shaped lug 118 is fixed to and projects outwardly from the end of the member 102 adjacent the openings 110 and 112, and a slot or aperture 120 is provided in the member 102 adjacent and inwardly from the circular opening 116.

The second member or plate 104 is provided with a circular opening 122 adjacent one end and a pair of spaced arcuate slots or openings 124 and 126 adjacent its opposite end that define a cross-piece 128 having an enlarged central ring portion 130.

A first transverse slot 132 provided in the member 104 between the opening 122 and the slot 124 and a second transverse slot 134 is provided in the member 104 between one end of the member 104 and the slot 134.

An angle member or L-shaped lug 136 is fixed to one end of the member 104 adjacent the transverse slot 134 and a further opening or aperture 138 is provided in the member 104 between the slot 132 and opening 122.

The locking member or element 106 comprises a flat ring or centrally apertured plate 140 having a pair of diametrically opposed peripheral notches 142. A pair of diametrically opposed, arcuate walls 144 and 146 are fixed to or form an integral part of the plate 140 and are positioned in the notches 142.

The walls 144 and 146 include first and second edges 148 and 150 and there is provided a first bayonet slot 152 in the edge 148 of the wall 144 and a further bayonet slot 154 in the edge 150 of the wall 146.

A rivet or pivot pin 156 secures the locking member or plate 140 to the outer face of the member 104 and also attaches the enlarged central, offset-ring portion 157 of the spring member 108 to the outer face of the locking member 140.

The spring member 108 is disposed longitudinally of the member 104 and includes end flanges 158 and 160 that are received in the slots 132 and 134 respectively.

The locking member 106 is provided with a radially projecting arm 162 having a finger grip or end flange 164 that will bear against one side edge of the member 102 when the locking member is in its locked position.

In practical use of the present invention illustrated in Figures 11–16 inclusively, the member 102 is placed in juxtaposition with the member 104, so that the lug 118 of member 102 will enter the opening 138 and the lug 136 of member 104 will enter the opening 120.

The walls 144 and 146 extend through the slots 124 and 126 in the member 104 and are received in the openings 110 and 112 of the member 102.

The ends 158 and 160 bear against the inner face of the member 102 to yieldingly urge the member 102 from the member 104.

As the members 102 and 104 are manually forced toward each other, and the locking member 106 rotated by the grip 164 so that the grip 164 will be urged toward one edge of the member 102, the cross-piece 114 will be received in the slots 152 and 154.

The spring member 108 will then yieldingly retain the cross-piece 114 locked in the slots 152 and 154, and the lugs 118 and 136 will prevent relative rotation of the members 102 and 104.

The members 102 and 104 are suitably secured to the ends of a chain, bracelet, necklace or the like and therefor, the openings 116 and 122 are so included in the members 102 and 104.

Reference is now directed to Figures 17–21 inclusive, wherein there is disclosed the present invention in still further modified form. In this embodiment, the numerals 170 and 172 represent first and second members that are detachably secured together through the medium of a locking member 174 and a spring member 176.

The member 170 includes a channel shaped central portion 178 and a retaining plate 180 integrally formed with the web of the channel portion 178 is folded into the channel shaped portion.

The locking member 174 includes a plate 182 having a pair of diametrically opposed peripheral notches 184 in which there is fixed a pair of opposed arcuate plates or walls 186 and 188. The walls 186 and 188 are provided with edges 190 and 192, and the edge 188 of the wall 186 is provided with a bayonet slot 194 whereas the edge 190 of the wall 188 is provided with a further bayonet slot 196.

The plate 182 is provided with a laterally projecting arm or finger grip 198 forming a means whereby the locking member 174 may be rotated.

The plate 182 is mounted between the web of the channel shaped portion 178 and the retaining plate 180 and the walls 186 and 188 extend through a circular opening 200 provided in the web of the channel shaped portion 178.

The member 172 is provided with a pair of semi-circular openings 202 and 204 that are spaced by a cross-piece 206 integrally formed with the member 172.

An anchor plate 208 is hinged, as at 210, to the member 172 and the spring member 176 is secured to the inner face of the plate 208 and includes an offset portion 212 that yieldingly bears against the member 172.

In practical use of the instant invention, as disclosed in Figures 17–21 inclusive, the anchor plate 208 and spring member 176 are fixed to a supporting structure such as a door or the like and the member 170 is secured to a door casing or a stationary structural element relatively close to the anchor plate 208.

As the member 172 is swung toward the member 170, the spring 176 will space the member 172 from the member 170 so that a user must force the member 172 toward the member 174 against action of the spring 176.

The walls 186 and 188 enter the openings 204 and 202 respectively and to lock the members 170 and 172 together it is merely necessary to rotate the locking member 174 so that the crosspiece 206 will enter the slots 144 and 146. The spring 212 will then yieldingly retain the crosspiece 206 locked in the slots 144 and 146.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A detachable fastener comprising first and second members, a channel shaped locking element, a pivot securing the locking element to the first member, said locking element having a pair of spaced leg portions disposed on opposite sides of the pivot, said leg portions having bayonet slots in opposite ends thereof for receiving the second member upon rotation of said locking element in one direction, and means secured to the locking element and confined between said leg portions resiliently locking said second member in said bayonet slots.

2. The combination of claim 1 wherein said means includes a U-shaped spring member disposed between the leg portions of said locking element, said spring member being secured to said pivot.

3. A clip comprising a base, an arm pivoted to the base, a locking member, a pivot pin securing the locking member to the base, said locking member including a pair of spaced walls having bayonet slots in opposite ends thereof receiving the arm, and a substantially U-shaped spring member having a leg portion secured to said pivot, said spring member yieldingly engaging the arm and retaining said arm in said slots, said pivot pin being located between said walls to permit the arm to enter both slots as the locking member is rotated with the arm extending between said walls.

4. In a clip including a base and an arm pivoted to the base; means for holding the arm against pivotal movement comprising a locking plate bearing against the base, a pivot securing the locking plate to the base, a pair of walls secured to the locking plate on opposite sides of the pivot and having slots in opposite ends thereof, the slot in one leg portion extending away from the slot in the other leg portion receiving the arm, and spring means mounted on the pivot contacting said arm and yieldingly urging and retaining said arm in said slots.

5. In a clip including a base and an arm pivoted to the base; means for holding the arm against pivotal movement comprising a locking plate bearing against the base, a pivot securing the locking plate to the base, a pair of walls secured to the locking plate on opposite sides of the pivot and having end edges, a first slot provided in one end edge of one wall and a second slot provided in the opposite end edge of the other wall, said slots receiving said arm, and a spring mounted on said pivot between said walls and resiliently engaging and locking said arm in said slots, the slot in one wall extending away from the slot in the other wall.

6. A fastener comprising a base, a member hingedly attached to one end of the base and movable toward and away from the base, and a rigid locking element rotatably secured to the base and including a pair of spaced walls having slots in the opposite ends thereof, said walls being located on opposite sides of the axis of rotation of said member, said member adapted to be received between said walls when the element is rotated to parallel the walls with the base after which rotation of said element will position said member into both of said slots.

7. A clip comprising an elongated base plate, an arm having one end pivoted to one end of the base plate for swinging movement of the arm toward and away from the base plate, a stud projecting laterally from the other end of the base plate, a channel shaped locking member having a web and a pair of spaced leg portions joined by said web, said web having a central aperture therein receiving said stud to permit rotation of the member on the stud, said leg portions being located on opposite sides of the stud, each of said leg portions having a bayonet slot therein, said slots being located in opposite ends of the walls and extending away from one another, and a U-shaped spring retained on the stud in juxtaposition with said web and disposed between said leg portions, one limb of said spring being biased upwardly across the slots, said leg portions being spaced apart sufficiently to permit the free end of said arm to be moved therebetween when the leg portions are disposed longitudinally of the base plate, whereby rotation of said locking member in one direction will cause movement of the arm against the said limb of said spring and into the bayonet slots.

8. In a fastening device including a base having a swinging pin attached thereto, means for engaging and holding the pin against swinging movement comprising a rotatable channel shaped locking member having its web centrally pivoted to the base and its leg portions disposed on opposite sides of the axis of rotation of said member, said leg portions having slots in the opposite ends thereof extending away from one another and adapted to receive the arm.

9. A fastener comprising first and second members disposed in juxtaposition when connected together, said first member having an opening therein and a cross piece extending diametrically across the opening, a locking element rotatably supported on the second member and including a pair of spaced parallel rigid walls each having a bayonet slot, said slots extending in opposite directions from each other, said walls being disposed on opposite sides of the axis of rotation of said element, said walls adapted to extend through said opening on opposite sides of said cross piece whereby rotation of said element will position said cross piece in both slots.

10. A detachable fastener comprising first and second members, a locking element rotatably secured to the first member, said locking element including a pair of spaced walls each having end edges, a first bayonet slot provided in one end edge of one wall and a second bayonet slot provided in the opposite end edge of the other wall, the slot in one wall extending in the opposite direction from the slot in the other wall.

11. The combination of claim 10 and a spring mounted between said walls and underlying said second member and yieldingly urging the second member against an edge of each slot.

HENRI J. DORGELYS.

REFERENCES CITED

The following references are of record in the file of this patent:

UNITED STATES PATENTS

| Number | Name | Date |
|---|---|---|
| 375,358 | Jenks | Dec. 27, 1887 |
| 423,853 | Belisle | Mar. 18, 1890 |
| 708,610 | Zelly | Sept. 9, 1902 |
| 734,263 | Hickok | July 21, 1903 |
| 743,835 | Dieges | Nov. 10, 1903 |
| 891,996 | Ives et al. | June 30, 1908 |
| 993,482 | Waller | May 30, 1911 |
| 1,080,792 | Tueckmantel | Dec. 9, 1913 |
| 1,228,025 | Kendall | May 29, 1917 |
| 1,523,009 | Folkman | Jan. 13, 1925 |
| 1,967,627 | Riley | July 24, 1934 |
| 2,016,041 | Koopetz | Oct. 1, 1935 |
| 2,260,048 | Newell | Oct. 21, 1941 |
| 2,282,360 | Horrocks | May 12, 1942 |
| 2,529,582 | Ziahodiaken | Nov. 14, 1950 |